US008781217B2

(12) United States Patent
Gurman et al.

(10) Patent No.: US 8,781,217 B2
(45) Date of Patent: Jul. 15, 2014

(54) ANALYSIS OF THREE-DIMENSIONAL SCENES WITH A SURFACE MODEL

(71) Applicant: Primesense Ltd., Tel Aviv (IL)

(72) Inventors: Amiad Gurman, Elkana (IL); Tomer Yanir, Rinatya (IL); Michael Brand, Bentleigh East (AU); Eran Guendelman, Tel Aviv (IL)

(73) Assignee: Primesense Ltd., Tel Aviv (IL)

( * ) Notice: Subject to any disclaimer, the term of this patent is extended or adjusted under 35 U.S.C. 154(b) by 0 days.

(21) Appl. No.: 13/867,083

(22) Filed: Apr. 21, 2013

(65) Prior Publication Data
US 2013/0230234 A1     Sep. 5, 2013

Related U.S. Application Data

(62) Division of application No. 12/854,187, filed on Aug. 11, 2010.

(60) Provisional application No. 61/349,907, filed on May 31, 2010.

(51) Int. Cl.
*G06K 9/00* (2006.01)
*G06T 15/00* (2011.01)

(52) U.S. Cl.
USPC .......................................... 382/154; 345/419

(58) Field of Classification Search
USPC ................................................ 382/106, 173
See application file for complete search history.

(56) References Cited

U.S. PATENT DOCUMENTS

| | | | |
|---|---|---|---|
| 5,684,887 A | 11/1997 | Lee et al. |
| 5,846,134 A | 12/1998 | Latypov |
| 5,852,672 A | 12/1998 | Lu |
| 5,862,256 A | 1/1999 | Zetts et al. |
| 5,864,635 A | 1/1999 | Zetts et al. |
| 5,870,196 A | 2/1999 | Lulli et al. |
| 6,002,808 A | 12/1999 | Freeman |
| 6,176,782 B1 | 1/2001 | Lyons et al. |
| 6,256,033 B1 | 7/2001 | Nguyen |

(Continued)

FOREIGN PATENT DOCUMENTS

| | | |
|---|---|---|
| JP | H03-029806 A | 2/1991 |
| JP | H10-235584 A | 9/1998 |

(Continued)

OTHER PUBLICATIONS

Krumm etla., "Multi-camera multi-person tracking for EasyLiving", Visual Surveillance, 2000. Proceedings. Third IEEE International Workshop on, 2000.*

(Continued)

*Primary Examiner* — Anand Bhatnagar
*Assistant Examiner* — Soo Park
(74) *Attorney, Agent, or Firm* — D. Kligler I.P. Services Ltd.

(57) ABSTRACT

A method for processing data includes receiving a depth map of a scene containing a humanoid form. The depth map is processed so as to identify three-dimensional (3D) connected components in the scene, each connected component including a set of the pixels that are mutually adjacent and have mutually-adjacent depth values. Separate, first and second connected components are identified as both belonging to the humanoid form, and a representation of the humanoid form is generated including both of the first and second connected components.

12 Claims, 7 Drawing Sheets

(56) References Cited

U.S. PATENT DOCUMENTS

| | | | |
|---|---|---|---|
| 6,658,136 B1 | 12/2003 | Brumitt | |
| 6,681,031 B2 | 1/2004 | Cohen et al. | |
| 6,771,818 B1 | 8/2004 | Krumm et al. | |
| 6,857,746 B2 | 2/2005 | Dyner | |
| 7,003,134 B1 | 2/2006 | Covell et al. | |
| 7,003,136 B1* | 2/2006 | Harville | 382/103 |
| 7,013,046 B2 | 3/2006 | Kawamura et al. | |
| 7,042,440 B2 | 5/2006 | Pryor et al. | |
| 7,068,815 B2* | 6/2006 | Chang et al. | 382/106 |
| 7,170,492 B2 | 1/2007 | Bell | |
| 7,215,815 B2 | 5/2007 | Honda | |
| 7,259,747 B2 | 8/2007 | Bell | |
| 7,302,099 B2 | 11/2007 | Zhang et al. | |
| 7,317,830 B1 | 1/2008 | Gordon et al. | |
| 7,340,077 B2 | 3/2008 | Gokturk | |
| 7,348,963 B2 | 3/2008 | Bell | |
| 7,428,542 B1 | 9/2008 | Fink et al. | |
| 7,536,032 B2 | 5/2009 | Bell | |
| 7,555,158 B2 | 6/2009 | Park et al. | |
| 7,573,480 B2* | 8/2009 | Gordon | 345/475 |
| 7,580,572 B2 | 8/2009 | Bang et al. | |
| 7,583,275 B2 | 9/2009 | Neumann et al. | |
| 7,925,077 B2 | 4/2011 | Woodfill et al. | |
| 7,987,021 B2* | 7/2011 | Takaoka | 700/259 |
| 8,036,449 B2* | 10/2011 | Asatani et al. | 382/153 |
| 8,175,374 B2 | 5/2012 | Pinault et al. | |
| 8,249,334 B2 | 8/2012 | Berliner et al. | |
| 8,280,106 B2 | 10/2012 | Ma | |
| 8,320,621 B2 | 11/2012 | Mceldowney | |
| 8,358,342 B2 | 1/2013 | Park | |
| 8,379,926 B2 | 2/2013 | Kanhere et al. | |
| 8,405,656 B2 | 3/2013 | El Dokor et al. | |
| 8,411,149 B2 | 4/2013 | Maison et al. | |
| 8,411,932 B2 | 4/2013 | Liu et al. | |
| 8,503,720 B2 | 8/2013 | Shotton et al. | |
| 2002/0071607 A1 | 6/2002 | Kawamura et al. | |
| 2003/0095698 A1 | 5/2003 | Kawano | |
| 2003/0156756 A1 | 8/2003 | Gokturk et al. | |
| 2003/0235341 A1 | 12/2003 | Gokturk et al. | |
| 2004/0091153 A1 | 5/2004 | Nakano et al. | |
| 2004/0183775 A1 | 9/2004 | Bell | |
| 2004/0184640 A1 | 9/2004 | Bang et al. | |
| 2004/0184659 A1 | 9/2004 | Bang et al. | |
| 2004/0258306 A1 | 12/2004 | Hashimoto | |
| 2005/0031166 A1 | 2/2005 | Fujimura et al. | |
| 2005/0088407 A1 | 4/2005 | Bell et al. | |
| 2005/0089194 A1 | 4/2005 | Bell | |
| 2005/0265583 A1 | 12/2005 | Covell et al. | |
| 2005/0271279 A1 | 12/2005 | Fujimura et al. | |
| 2006/0092138 A1 | 5/2006 | Kim et al. | |
| 2006/0115155 A1 | 6/2006 | Lui et al. | |
| 2006/0159344 A1 | 7/2006 | Shao et al. | |
| 2007/0003141 A1* | 1/2007 | Rittscher et al. | 382/181 |
| 2007/0076016 A1 | 4/2007 | Agarwala et al. | |
| 2007/0126921 A1* | 6/2007 | Gallagher et al. | 348/362 |
| 2007/0154116 A1 | 7/2007 | Shieh | |
| 2007/0230789 A1 | 10/2007 | Chang et al. | |
| 2008/0123940 A1 | 5/2008 | Kundu et al. | |
| 2008/0226172 A1 | 9/2008 | Connell | |
| 2008/0236902 A1 | 10/2008 | Imaizumi | |
| 2008/0252596 A1 | 10/2008 | Bell et al. | |
| 2008/0260250 A1 | 10/2008 | Vardi | |
| 2008/0267458 A1 | 10/2008 | Laganiere et al. | |
| 2008/0310706 A1* | 12/2008 | Asatani et al. | 382/153 |
| 2009/0009593 A1 | 1/2009 | Cameron et al. | |
| 2009/0027335 A1 | 1/2009 | Ye | |
| 2009/0078473 A1 | 3/2009 | Overgard et al. | |
| 2009/0083622 A1 | 3/2009 | Chien et al. | |
| 2009/0096783 A1 | 4/2009 | Shpunt et al. | |
| 2009/0116728 A1 | 5/2009 | Agrawal et al. | |
| 2009/0183125 A1 | 7/2009 | Magal et al. | |
| 2009/0222388 A1* | 9/2009 | Hua et al. | 706/12 |
| 2009/0297028 A1 | 12/2009 | De Haan | |
| 2010/0002936 A1 | 1/2010 | Khomo | |
| 2010/0007717 A1 | 1/2010 | Spektor et al. | |
| 2010/0111370 A1 | 5/2010 | Black et al. | |
| 2010/0235786 A1 | 9/2010 | Maizels et al. | |
| 2010/0302138 A1 | 12/2010 | Poot et al. | |
| 2010/0303289 A1 | 12/2010 | Polzin et al. | |
| 2010/0322516 A1 | 12/2010 | Xu et al. | |
| 2011/0025689 A1* | 2/2011 | Perez et al. | 345/420 |
| 2011/0052006 A1 | 3/2011 | Gurman et al. | |
| 2011/0164032 A1 | 7/2011 | Shadmi et al. | |
| 2011/0182477 A1 | 7/2011 | Tamrakar et al. | |
| 2011/0211754 A1 | 9/2011 | Litvak et al. | |
| 2011/0237324 A1 | 9/2011 | Clavin et al. | |
| 2011/0292036 A1 | 12/2011 | Sali et al. | |
| 2011/0293137 A1 | 12/2011 | Gurman et al. | |
| 2012/0070070 A1 | 3/2012 | Litvak | |

FOREIGN PATENT DOCUMENTS

| | | |
|---|---|---|
| WO | 9935633 A2 | 7/1999 |
| WO | 2003071410 A2 | 8/2003 |
| WO | 2004107272 A1 | 12/2004 |
| WO | 2005003948 A1 | 1/2005 |
| WO | 2005094958 A2 | 10/2005 |
| WO | 2007043036 A1 | 4/2007 |
| WO | 2007078639 A2 | 7/2007 |
| WO | 2007105205 A2 | 9/2007 |
| WO | 2007132451 A2 | 11/2007 |
| WO | 2007135376 A2 | 11/2007 |
| WO | 2008120217 A2 | 10/2008 |
| WO | 2010004542 A1 | 1/2010 |

OTHER PUBLICATIONS

Hart, D., U.S. Appl. No. 09/616,606, filed Jul. 14, 2000.

International Application PCT/IL2007/000306 Search Report dated Oct. 2, 2008.

Gesturetek Inc., Consumer Electronics Solutions, "Gesture Control Solutions for Consumer Devices", www.gesturetek.com, Toronto, Ontario, Canada, 2009.

International Application PCT/IL2006/000335 Preliminary Report on Patentability dated Apr. 24, 2008.

Avidan et al., "Trajectory triangulation: 3D reconstruction of moving points from amonocular image sequence", PAMI, vol. 22, No. 4, pp. 348-357, Apr. 2000.

LeClerc et al., "The direct computation of height from shading", IEEE Conference on Computer Vision and Pattern Recognition, pp. 552-558, Jun. 3-7, 1991.

Zhang et al., "Shape from intensity gradient", IEEE Transactions on Systems, Man, and Cybernetics—Part A: Systems and Humans, vol. 29, No. 3, pp. 318-325, May 1999.

Zhang et al., "Height recovery from intensity gradients", IEEE Conference on Computer Vision and Pattern Recognition, pp. 508-513, Jun. 20-24, 1994.

Horn, B., "Height and gradient from shading", International Journal of Computer Vision , vol. 5, No. 1, pp. 37-75, Aug. 1990.

Bruckstein, A., "On Shape from Shading", Computer Vision, Graphics, and Image Processing Journal, vol. 44, issue 2, pp. 139-154, Nov. 1988.

Zhang et al., "Rapid Shape Acquisition Using Color Structured Light and Multi-Pass Dynamic Programming", 1st International Symposium on 3D Data Processing Visualization and Transmission (3DPVT), Padova, Italy, Jun. 19-21, 2002.

Besl, P., "Active Optical Range Imaging Sensors", Journal Machine Vision and Applications, vol. 1, issue 2, pp. 127-152, Apr. 1988.

Horn et al., "Toward optimal structured light patterns", Proceedings of International Conference on Recent Advances in 3D Digital Imaging and Modeling, pp. 28-37, Ottawa, Canada, May 1997.

Goodman, J.W., "Statistical Properties of Laser Speckle Patterns", Laser Speckle and Related Phenomena, pp. 9-75, Springer-Verlag, Berlin Heidelberg, 1975.

Asada et al., "Determining Surface Orientation by Projecting a Stripe Pattern", IEEE Transactions on Pattern Analysis and Machine Intelligence, vol. 10, No. 5, pp. 749-754, Sep. 1988.

Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.

(56) References Cited

OTHER PUBLICATIONS

Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.
Kimmel et al., "Analyzing and synthesizing images by evolving curves with the Osher-Sethian method", International Journal of Computer Vision, vol. 24, issue 1, pp. 37-55, Aug. 1997.
Zigelman et al., "Texture mapping using surface flattening via multi-dimensional scaling", IEEE Transactions on Visualization and Computer Graphics, vol. 8, issue 2, pp. 198-207, Apr.-Jun. 2002.
Dainty, J.C., "Introduction", Laser Speckle and Related Phenomena, pp. 1-7, Springer-Verlag, Berlin Heidelberg, 1975.
Mendlovic, et al., "Composite harmonic filters for scale, projection and shift invariant pattern recognition", Applied Optics Journal, vol. 34, No. 2, pp. 310-316, Jan. 10, 1995.
Fua et al., "Human Shape and Motion Recovery Using Animation Models", 19th Congress, International Society for Photogrammetry and Remote Sensing, Amsterdam, The Netherlands, Jul. 2000.
Allard et al., "Marker-less Real Time 3D modeling for Virtual Reality", Immersive Projection Technology, Iowa State University, IPT 2004.
Howe et al., "Bayesian Reconstruction of 3D Human Motion from Single-Camera Video", Advances in Neural Information Processing Systems 12, Denver, USA, 1999.
Maizels et al., U.S. Appl. No. 61/429,767, filed Jan. 5, 2011.
Grammalidis et al., "3-D Human Body Tracking from Depth Images Using Analysis by Synthesis", Proceedings of the IEEE International Conference on Image Processing (ICIP2001), pp. 185-188, Thessaloniki, Greece, Oct. 7-10, 2001.
International Application PCT/IL2007/000574 Search Report dated Sep. 10, 2008.
Softkinetic S.A., "3D Gesture Recognition Platform for Developers of 3D Applications", Product Datasheet, IISU™, www.softkinetic-optrima.com, Belgium, 2007-2010.
Li et al., "Real-Time 3D Motion Tracking with Known Geometric Models", Real-Time Imaging Journal, vol. 5, pp. 167-187, Academic Press 1999.
Segen et al., "Shadow gestures: 3D hand pose estimation using a single camera", Proceedings of IEEE International Conference on Computer Vision and Pattern Recognition, pp. 479-485, Fort Collins, USA, Jun. 23-25, 1999.
Vogler et al., "ASL recognition based on a coupling between HMMs and 3D motion analysis", Proceedings of IEEE International Conference on Computer Vision, pp. 363-369, Mumbai, India, Jan. 4-7, 1998.
Gionis et al., "Similarity Search in High Dimensions via Hashing", Proceedings of the 25th Very Large Database (VLDB) Conference, Edinburgh, UK, Sep. 7-10, 1999.
Bleiweiss et al., "Markerless Motion Capture Using a Single Depth Sensor", SIGGRAPH Asia 2009, Yokohama, Japan, Dec. 16-19, 2009.
Comaniciu et al., "Mean Shift: A Robust Approach Toward Feature Space Analysis", IEEE Transactions on Pattern Analysis and Machine Intelligence, vol. 24, No. 4, pp. 603-619, May 2002.
Datar et al., "Locality-Sensitive Hashing Scheme Based on p-Stable Distributions", Proceedings of the Symposium on Computational Geometry, pp. 253-262, Brooklyn, USA, Jun. 9-11, 2004.
Dekker, L., "Building Symbolic Information for 3D Human Body Modeling from Range Data", Proceedings of the Second International Conference on 3D Digital Imaging and Modeling, IEEE computer Society, pp. 388-397, Ottawa, Canada, Oct. 4-8, 1999.
Holte et al., "Gesture Recognition using a Range Camera", Technical Report, Laboratory of Computer Vision and Media Technology, Aalborg University, Denmark, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, Jun. 2007.

Nam et al., "Recognition of Hand Gestures with 3D, Nonlinear Arm Movements", Pattern Recognition Letters, vol. 18, No. 1, pp. 105-113, Elsevier Science B.V. 1997.
Segen et al., "Human-computer interaction using gesture recognition and 3D hand tracking", ICIP 98, Proceedings of the IEEE International Conference on Image Processing, vol. 3, pp. 188-192, Chicago, USA, Oct. 4-7, 1998.
Ascension Technology Corporation, "Flock of Birds: Real-Time Motion Tracking", 2008.
Nesbat, S., "A System for Fast, Full-Text Entry for Small Electronic Devices", Proceedings of the 5th International Conference on Multimodal Interfaces, ICMI 2003, Vancouver, Canada, Nov. 5-7, 2003.
Bleiweiss et al., "Fusing Time-of-Flight Depth and Color for Real-Time Segmentation and Tracking", Editors R. Koch and A. Kolb: Dyn3D 2009, LNCS 5742, pp. 58-69, Springer-Verlag Berlin Heidelberg 2009.
Chinese Patent Application # 200780013930 Official Action dated Nov. 17, 2011.
Japanese Patent Application # 2009508667 Official Action dated Nov. 24, 2011.
Primesense Inc., "Prime Sensor™ NITE 1.1 Framework Programmer's Guide", Version 1.2, 2009.
Luxand Inc., "Luxand FaceSDK 3.0 Face Detection and Recognition Library Developer's Guide", years 2005-2010.
Intel Corporation, "Open Source Computer Vision Library Reference Manual", years 1999-2001.
Arya et al., "An Optimal Algorithm for Approximate Nearest Neighbor Searching in Fixed Dimensions", Association for Computing Machinery Journal, vol. 45, issue 6, pp. 891-923, New York, USA, Nov. 1998.
Muja et al., "Fast Approximate Nearest Neighbors with Automatic Algorithm Configuration", International Conference on Computer Vision Theory and Applications, pp. 331-340, Lisboa, Portugal, Feb. 5-8, 2009.
Mori et al., "Estimating Human Body Configurations Using Shape Context Matching", Proceedings of the European Conference on Computer Vision, vol. 3, pp. 666-680, Copenhagen, Denmark, May 27-Jun. 2, 2002.
Agarwal et al., "Monocular Human Motion Capture with a Mixture of Regressors", Proceedings of the 2004 IEEE Conference on Computer Vision and Pattern Recognition, San Diego, USA, Jun. 20-26, 2005.
Lv et al., "Single View Human Action Recognition Using Key Pose Matching and Viterbi Path Searching", Proceedings of IEEE Conference on Computer Vision and Pattern Recognition, Minneapolis, USA, Jun. 17-22, 2007.
Munoz-Salinas et al., "People Detection and Tracking Using Stereo Vision and Color", Image and Vision Computing, vol. 25, No. 6, pp. 995-1007, Jun. 1, 2007.
Bradski, G., "Computer Vision Face Tracking for Use in a Perceptual User Interface", Intel Technology Journal, vol. 2, issue 2 (2nd Quarter 2008).
Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.
Kolsch et al., "Fast 2D Hand Tracking with Flocks of Features and Multi-Cue Integration", IEEE Workshop on Real-Time Time Vision for Human Computer Interaction (at CVPR'04), Washington, USA, Jun. 27-Jul. 2, 2004.
Shi et al., "Good Features to Track", IEEE Conference on Computer Vision and Pattern Recognition, pp. 593-600, Seattle, USA, Jun. 21-23, 1994.
Vosselman et al., "3D Building Model Reconstruction From Point Clouds and Ground Plans", International Archives of Photogrammetry and Remote Sensing, vol. XXXIV-3/W4, pp. 37-43, Annapolis, USA, Oct. 22-24, 2001.
Submuth et al., "Ridge Based Curve and Surface Reconstruction", Eurographics Symposium on Geometry Processing, Barcelona, Spain, Jul. 4-6, 2007.

(56) References Cited

OTHER PUBLICATIONS

Fergus et al., "Object Class Recognition by Unsupervised Scale-Invariant Learning", Proceedings of the IEEE Conference on Computer Vision and Pattern Recognition, vol. 2, pp. 264-271, Jun. 18-20, 2003.

Cohen et al., "Interference of Human Postures by Classification of 3D Human Body Shape", IEEE International Workshop on Analysis and Modeling of Faces and Gestures, ICCV 2003, Nice, France, Oct. 14-17, 2003.

Agarwal et al., "3D Human Pose from Silhouettes by Relevance Vector Regression", Proceedings of the IEEE Conference on Computer Vision and Pattern Recognition, vol. 2, pp. 882-888, Jun. 27-Jul. 2, 2004.

Borenstein et al., "Combining Top-down and Bottom-up Segmentation", Proceedings of the IEEE Conference on Computer Vision and Pattern Recognition, Jun. 27-Jul. 2, 2004.

Karlinsky et al., "Combined Model for Detecting, Localizing, Interpreting and Recognizing Faces", Faces in Real-Life Images workshop, European Conference on Computer Vision, France, Oct. 12-18, 2008.

Ullman, S., "Object Recognition and Segmentation by a Fragment-Based Hierarchy", Trends in Cognitive Sciences, vol. 11, No. 2, pp. 58-64, Feb. 2007.

Shakhnarovich et al., "Fast Pose Estimation with Parameter Sensitive Hashing", Proceedings of the 9th IEEE International Conference on Computer Vision (ICCV 2003), pp. 750-759, Nice, France, Oct. 14-17, 2003.

Ramanan et al., "Training Deformable Models for Localization", Proceedings of the 2006 IEEE Conference on Computer Vision and Pattern Recognition, pp. 206-213, New York, USA, Jun. 17-22, 2006.

Ramanan, D., "Learning to Parse Images of Articulated Bodies", Neural Information Processing Systems Foundation year 2006.

Jiang, H., "Human Pose Estimation Using Consistent Max-Covering", 12th IEEE International Conference on Computer Vision, Kyoto, Japan, Sep. 27-Oct. 4, 2009.

Shotton et al., "Real-Time Human Pose Recognition in Parts from Single Depth Images", 24th IEEE Conference on Computer Vision and Pattern Recognition, Colorado Springs, USA, Jun. 20-25, 2011.

Rodgers et al., "Object Pose Detection in Range Scan Data", IEEE Conference on Computer Vision and Pattern Recognition, pp. 2445-2452, New York, USA, Jun. 17-22, 2006.

U.S. Appl. No. 12/854,188 Official Action dated Nov. 26, 2012.

U.S. Appl. No. 12/300,086 Official Action dated Jan. 17, 2012.

Litvak et al., U.S. Appl. No. 13/786,508, filed Mar. 6, 2013.

Gurman et al., U.S. Appl. No. 13/461,802, filed May 2, 2012.

U.S. Appl. No. 13/229,727 Office Action dated Mar. 13, 2013.

U.S. Appl. No. 12/854,187 Office Action dated Apr. 19, 2013.

Grzeszczuk et al., "Stereo based gesture recognition invariant for 3D pose and lighting", Proceedings of IEEE Conference on Computer Vision and Pattern Recognition, vol. 1, pp. 826-833, Jun. 13-15, 2000.

Li et al., "Statistical modeling of complex backgrounds for foreground object detection", IEEE Transactions on Image Processing, vol. 13, No. 11, pp. 1459-1472, Nov. 2004.

Ren et al., "Real-time modeling of 3-D soccer ball trajectories from multiple fixed cameras", IEEE Transactions on Circuits and Systems for Video Technology, vol. 18, No. 3, pp. 350-362, Mar. 2008.

Gurman, A., U.S. Appl. No. 13/663,518, filed Oct. 30, 2012.

Ess et al., "Improved multi-person tracking with active occlusion handling", ICRA workshop of people Detection and tracking, pp. 1-6, 2009.

U.S. Appl. No. 13/867,085 Office Action dated Nov. 7, 2013.

Krumm et al., "Multi-camera multi person tracking for EasyLiving"., Visual surveillance, 2000, Proceedings, Third International workshop pp. 1-8, 2000.

Yous et al., "People detection and tracking with World-Z map from single stereo camera"., Visual surveillance, 2008, Eighth International workshop, pp. 1-8, 2008.

Damen et al., "Detecting carried objects in short video sequences", ECCV, School of computing, University of Leeds, pp. 1-14, 2008.

Ran et al., "Multi moving people detection from binocular sequences", Center for Automation Research Institute of Advanced Computer Studies, University of Maryland, pp. 1-4, 2003.

Balcells et al., "An appearance—based approach for consistent labeling of humans and objects in video", Pattern Analysis and Application, pp. 373-385, 2004.

Cucchiara et al., "Track-based and object-based occlusion for people tracking refinement indoor surveillance", VSSN, pp. 1-7, 2004.

\* cited by examiner

ANALYSIS OF THREE-DIMENSIONAL SCENES WITH A SURFACE MODEL

CROSS-REFERENCE TO RELATED APPLICATIONS

This application is a division of U.S. patent application Ser. No. 12/854,187, filed Aug. 11, 2010, which claims the benefit of U.S. Provisional Patent Application 61/349,907, filed May 31, 2010, which is incorporated herein by reference.

FIELD OF THE INVENTION

The present invention relates generally to methods and systems for three-dimensional (3D) mapping, and specifically to processing of 3D map data.

BACKGROUND OF THE INVENTION

A number of different methods and systems are known in the art for creating depth maps. In the present patent application and in the claims, the term "depth map" refers to a representation of a scene as a two-dimensional matrix of pixels, in which each pixel corresponds to a respective location in the scene and has a respective pixel value indicative of the distance from a certain reference location to the respective scene location. (In other words, the depth map has the form of an image in which the pixel values indicate topographical information, rather than brightness and/or color of the objects in the scene.) Depth maps may be created, for example, by detection and processing of an image of an object onto which a laser speckle pattern is projected, as described in PCT International Publication WO 2007/043036 A1, whose disclosure is incorporated herein by reference.

Depth maps may be processed in order to segment and identify objects in the scene. Identification of humanoid forms (meaning 3D shapes whose structure resembles that of a human being) in a depth map, and changes in these forms from scene to scene, may be used as a means for controlling computer applications. For example, PCT International Publication WO 2007/132451, whose disclosure is incorporated herein by reference, describes a computer-implemented method in which a depth map is segmented so as to find a contour of a humanoid body. The contour is processed in order to identify a torso and one or more limbs of the body. An input is generated to control an application program running on a computer by analyzing a disposition of at least one of the identified limbs in the depth map.

SUMMARY OF THE INVENTION

Embodiments of the present invention provide methods, devices and software for extracting information from depth maps.

There is therefore provided, in accordance with an embodiment of the present invention, a method for processing data, which includes receiving a temporal sequence of depth maps of a scene containing a stationary background and one or more moving foreground objects that conceal a part of the background, the depth maps comprising a matrix of pixels, at least some of which have respective pixel depth values and correspond to respective locations in the scene. A digital processor processes a first depth map in the sequence so as to identify a first portion of the stationary background that is not concealed by the moving foreground objects in the first map. At least a second depth map in the sequence is processed so as to identify at least a second portion of the stationary background, which is different from the first portion due to motion of at least one of the foreground objects over the sequence. The processor constructs a background model of the scene by combining at least the first and second portions of the stationary background.

In some embodiments, the method includes generating a foreground map by finding, based on the background model, pixels that are closer than the background model. A humanoid figure may be found, including pixels belonging to the foreground map and pixels that were found to belong to the figure in a previous frame.

In a disclosed embodiment, the method includes identifying a planar floor in the depth maps. A shadow of one of the objects may be identified in the depth map, and the depth of the object casting the shadow may be used in evaluating the background model.

Typically, constructing the background model includes updating the background model responsively to changes that appear in the background over the sequence of the depth maps. In a disclosed embodiment, the depth maps are captured by an imaging assembly, and the method includes assessing an extent of the changes in the background model between the depth maps in the sequence, and detecting that the imaging assembly has moved when the extent of the changes exceeds a predetermined threshold.

There is also provided, in accordance with an embodiment of the present invention, a method for processing data, including receiving a depth map of a scene containing one or more foreground objects positioned in relation to a surface. A digital processor processes the depth map so as to identify and generate a parametric model of the surface, and to segment one or more of the objects in the scene by removing the surface represented by the parametric model from the depth map.

In a disclosed embodiment, the surface is a planar surface corresponding to a floor on which at least one of the objects is positioned. Processing the depth map includes computing local normals at the pixels in the depth map, and clustering the pixels according to the planes predicted by the local normals in order to identify the planar surfaces. Typically, the depth maps are captured by an imaging assembly, and the clustering operation includes processing respective depth values of at least some of the pixels in order to predict a height of the imaging assembly with respect to each pixel, and clustering the pixels having the same predicted height of the imaging assembly.

There is additionally provided, in accordance with an embodiment of the present invention, a method for processing data, including receiving a depth map of a scene containing a humanoid form. A digital processor processes the depth map so as to identify three-dimensional (3D) connected components in the scene. Each connected component includes a set of the pixels that are mutually adjacent and have mutually-adjacent depth values. The processor identifies separate connected components as belonging to the humanoid form and generates a representation of the humanoid form including several connected components.

In a disclosed embodiment, processing the depth map includes locating edges in the depth map and blocks of pixels between the edges, and clustering adjacent blocks of the pixels in three dimensions in order to identify 3D clusters.

In some embodiments, receiving the depth map includes receiving a temporal sequence of depth maps, and identifying connected components includes tracking the connected components over multiple, successive depth maps in the sequence. Tracking the connected components may include assigning a common identifier to the connected components belonging to the same humanoid form in a first depth map in the sequence, and using this common identifier to determine that the connected components belong to the humanoid form in a second, subsequent depth map. Typically, assigning the common identifier includes labeling the pixels of the connected components in the depth map with the common identifier. When the humanoid form in the second depth map is in contact with another object, thereby causing the second connected component to incorporate the other object, the common identifier may be used in separating the labeled pixels of the second connected component that belong to the humanoid form from the pixels belonging to other object in order to generate the representation of the humanoid form appearing in the second depth map.

Additionally or alternatively, tracking the connected components includes estimating a velocity of motion of the connected components, and generating the representation includes maintaining an identification of an occluded part of the humanoid form using the estimated velocity.

In one embodiment, the humanoid form in the depth map is partly occluded by another object, and the connected components correspond to parts of the humanoid form that are separated by the occluding object, and generating the representation includes identifying such a situation and preserving the connected components in the representation of the humanoid form.

There is moreover provided, in accordance with an embodiment of the present invention, apparatus for processing data, including an imaging assembly, which is configured to produce a depth map of a scene containing one or more objects positioned in relation to a surface. A processor is configured to process the depth map so as to identify and generate a parametric model of the surface, and to segment one or more of the objects in the scene by removing the surface represented by the parametric model from the depth map.

There is furthermore provided, in accordance with an embodiment of the present invention, apparatus for processing data, including an imaging assembly, which is configured to produce a depth map of a scene containing a humanoid form. A processor is configured to process the depth map so as to identify three-dimensional (3D) connected components in the scene, each connected component including a set of the pixels that are mutually adjacent and have mutually-adjacent depth values, to identify separate connected components as belonging to the humanoid form, and to generate a representation of the humanoid form including several connected components.

There is also provided, in accordance with an embodiment of the present invention, a computer software product, including a tangible computer-readable medium in which program instructions are stored, which instructions, when read by a computer, cause the computer to receive a temporal sequence of depth maps of a scene containing a stationary background and one or more moving foreground objects that conceal a part of the background, and to perform one or more of the methods described above.

The present invention will be more fully understood from the following detailed description of the embodiments thereof, taken together with the drawings in which:

DETAILED DESCRIPTION OF EMBODIMENTS

Overview

Figure 1:
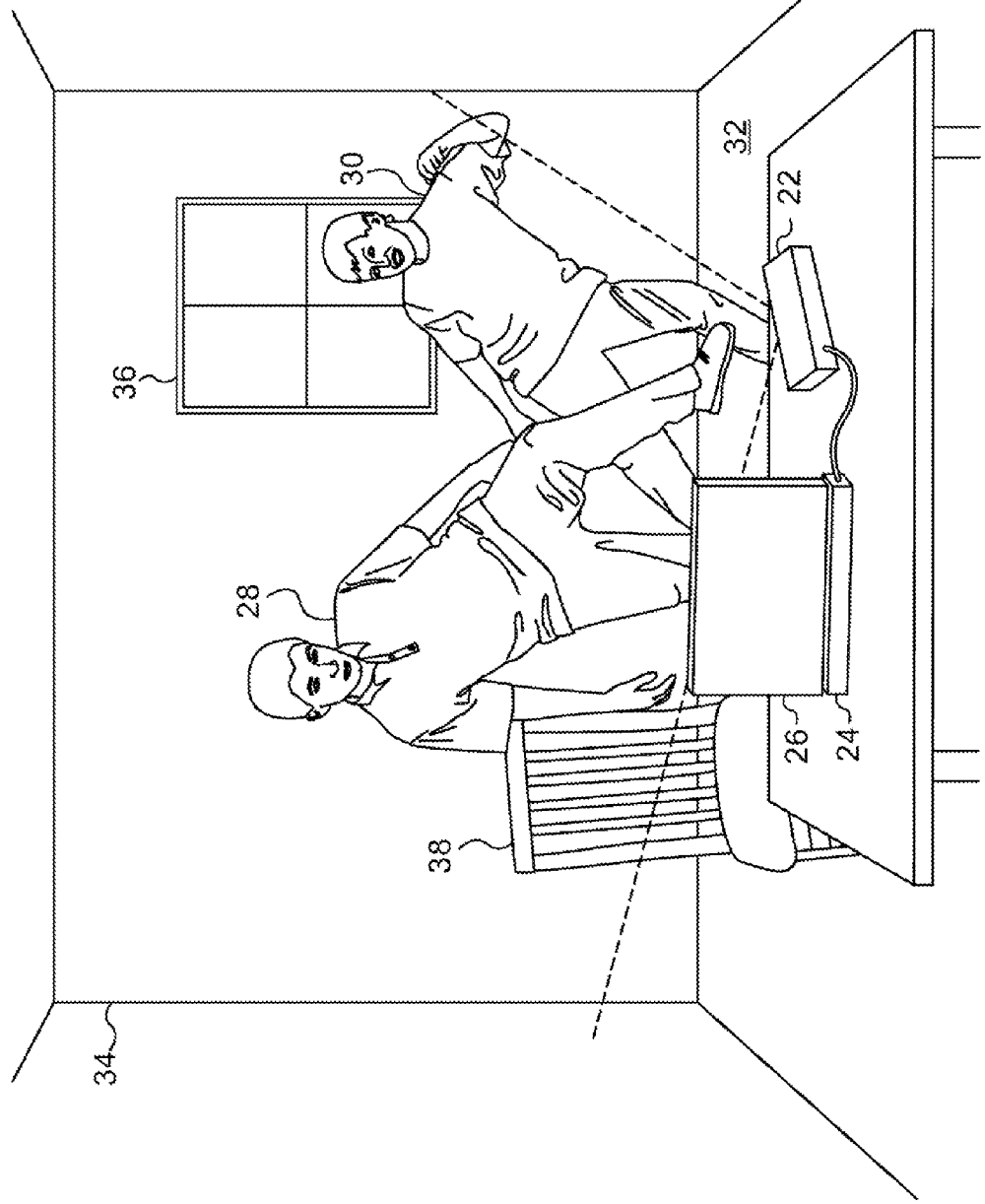
FIG. 1 is a schematic, pictorial illustration of a system for 3D mapping and scene analysis, in accordance with an embodiment of the present invention.

Depth maps provide a wealth of information, particularly when they are presented in a continuous stream over time. Games and other applications based on depth maps, however, have developed only slowly due to the difficulties inherent in capturing, processing, and extracting high-level information from such maps.

Embodiments of the present invention that are described hereinbelow address these difficulties by providing robust, efficient methods for processing depth maps, and particularly for locating and tracking humanoid forms in sequences of depth maps. Such maps typically represent a scene containing a stationary background and one or more moving foreground objects (which conceal a part of the background). In the disclosed embodiments, a digital processor identifies and models the background, including the floor and walls that typically appear in the background in indoor scenes. The processor uses the model to in order to detect parts of humanoid forms in the foreground that are occluding the background model (and therefore will be considered henceforth to belong to the foreground), and may associate them with other parts of the forms that are not in the foreground. The processor analyzes the moving foreground objects in order to identify and track forms of interest, particularly humanoid forms.

In some of the disclosed embodiments, the processor constructs the background model by identifying portions of the stationary background in each depth map that are not concealed by the foreground objects. Because the foreground objects move from map to map, different parts of the background are typically revealed in different maps. The processor creates the background model by combining different portions of the stationary background from different maps in the sequence.

Additionally, the processor may specifically identify surfaces having certain geometrical forms that can be modeled parametrically, particularly planar surfaces, such as the floor and walls, which make up part of the background. For this purpose, in one embodiment, the processor computes local normals at the pixels in the depth map, by considering the depth values at the neighboring pixels. The processor clusters pixels whose local normals point in roughly the same direction in order to identify the floor and possibly other planar surfaces.

The processor extracts humanoid forms (and possibly other objects of interest) from the scene by identifying 3D connected components in the depth map. Each connected component comprises a set of the pixels that are mutually adjacent and have mutually-adjacent depth values, meaning that the depth values of neighboring pixels do not deviate by more than a (small) predetermined threshold amount. The processor identifies and tracks these connected components in order to compute geometrical models of the humanoid forms, which may then be processed further in order to identify high-level features such as body posture, movement, and gestures.

Although ideally, each humanoid form should appear as a single connected component, it often occurs, because of aspects of the scene itself, that a given humanoid form will appear as a set of two or more separate connected components. This separation makes it difficult to identify the humanoid form altogether, let alone modeling the high-level features. For example, in some depth maps the humanoid form may be partly occluded by another object, so that the form is split into two or more separate connected components. In other cases, one part of the humanoid form may partly occlude another part in the depth map. In the embodiments that are described hereinbelow, however, the processor assigns a common identifier to all the connected components that make up a given humanoid form, and uses this identifier in tracking the connected components even when they become separated or occlude one another. The methods of these embodiments enable the processor to resolve anomalous situations and to generate a consistent representation of the humanoid form even in the face of occlusions.

System Description

FIG. 1 is a schematic, pictorial illustration of a 3D user interface system 20, in accordance with an embodiment of the present invention. The user interface is based on a 3D imaging assembly 22, which captures 3D scene information that includes at least a part of the bodies of users 28 and 30. Assembly 22 may also capture color video images of the scene. Assembly 22 outputs a sequence of frames containing 3D map data (and possibly color image data, as well) to a computer 24, which extracts high-level information from the map data. This high-level information is provided via an API to an application running on computer 24, which drives a display screen 26 accordingly. In the pictured example, for instance, users 28 and 30 interact with game software running on computer 24 by moving their limbs and changing their body postures.

Computer 24 processes data generated by assembly 22 in order to reconstruct a depth map of the scene (also referred to as a "3D map") containing users 28 and 30. In one embodiment, assembly 22 projects a pattern of spots onto the scene and captures an image of the projected pattern. Assembly 22 or computer 24 then computes the 3D coordinates of points in the scene (including points on the surface of the user's body) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from assembly 22. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, system 20 may use other methods of 3D mapping, based on single or multiple cameras or other types of sensors, as are known in the art.

In the present embodiment, system 20 captures and processes a sequence of three-dimensional (3D) maps containing users 28 and 30, while the users move their bodies. Software running on assembly 22 and/or computer processes the 3D map data to extract the humanoid forms corresponding to the users in the scene. For this purpose (as described in detail hereinbelow), the software identifies and models the stationary scene background, including planar surfaces such as a floor 32 and walls 34, as well as other background objects, such as a window 36 in this example. The software combines foreground parts of the image with detected parts of humanoid forms in order to detect and track the humanoid forms of users 28 and 30, as well as other foreground objects (such as a chair 38).

Assembly 22 or computer 24 typically analyzes geometrical features of the humanoid forms in order to extract a skeleton of each body, including 3D locations and orientations of the users' hands and joints. It may also analyze the trajectory of the hands over multiple frames in order to identify gestures delineated by the hands. These aspects of the operation of system 20 are, however, beyond the scope of the present patent application. The skeleton and gesture information are provided via an API to an application program running on computer 24. This program may, for example, move and modify images presented on display 26 in response to the skeleton and/or gesture information.

Computer 24 typically comprises a general-purpose computer processor, which is programmed in software to carry out the functions described hereinbelow. The software may be downloaded to the processor in electronic form, over a network, for example, or it may alternatively be provided on tangible, non-transitory media, such as optical, magnetic, or electronic memory media. Alternatively or additionally, some or all of the described functions of the computer may be implemented in dedicated hardware, such as a custom or semi-custom integrated circuit or a programmable digital signal processor (DSP). Although computer 24 is shown in FIG. 1, by way of example, as a separate unit from imaging assembly 22, some or all of the processing functions of the computer may be performed by a suitable microprocessor and software or by dedicated circuitry within the housing of the imaging assembly or otherwise associated with the imaging assembly.

As another alternative, at least some of these processing functions may be carried out by a suitable processor that is integrated with display screen 26 (in a television set, for example) or with any other suitable sort of computerized device, such as a game console or media player. The sensing functions of assembly 22 may likewise be integrated into the computer or other computerized apparatus that is to be controlled by the sensor output.

Figure 2:
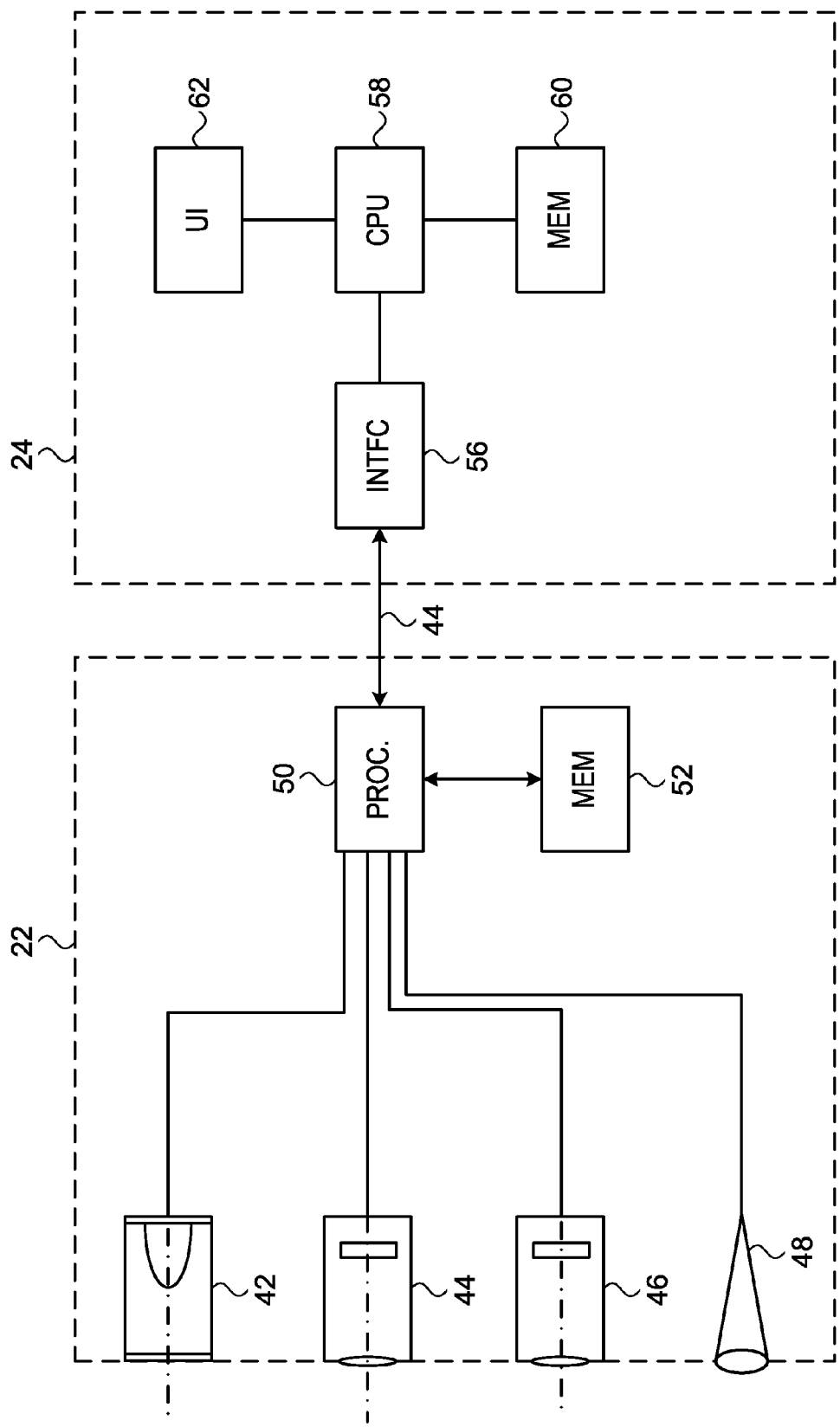
FIG. 2 is a block diagram that schematically illustrates elements of a 3D imaging assembly and an associated computer, in accordance with an embodiment of the present invention.

FIG. 2 is a block diagram that schematically illustrates elements of imaging assembly 22 and computer 24 in system 20, in accordance with an embodiment of the present invention. Imaging assembly 22 comprises an illumination subassembly 42, which projects a pattern onto the scene of interest. A depth imaging subassembly 44, such as a suitably-configured video camera, captures images of the pattern on the scene. Typically, illumination subassembly 42 and imaging subassembly 44 operate in the infrared range, although other spectral ranges may also be used. Optionally, a color video camera 46 captures 2D color images of the scene, and a microphone 48 may also capture sound.

A processor 50 receives the images from subassembly 44 and compares the pattern in each image to a reference pattern stored in a memory 52. The reference pattern is typically captured in advance by projecting the pattern onto a reference plane at a known distance from assembly 22. Generally, this plane is perpendicular to the optical axis of subassembly 44. Processor 50 computes local shifts of parts of the pattern in the images captured by subassembly 44 relative to the reference pattern and translates these shifts into depth coordinates. Details of this process are described, for example, in PCT International Publication WO 2010/004542, whose disclosure is incorporated herein by reference. Alternatively, as noted earlier, assembly 22 may be configured to generate depth maps by other means that are known in the art, such as stereoscopic imaging or time-of-flight measurements.

Processor 50 outputs the depth maps via a communication link 54, such as a Universal Serial Bus (USB) connection, to a suitable interface 56 of computer 24. The computer comprises a central processing unit (CPU) 58 with a memory 60 and a user interface 62, which drives display 26 and may include other components, as well. As noted above, imaging assembly 22 may alternatively output only raw images from subassembly 44, and the depth map computation described above may be performed in software by CPU 58, or at least some of the functions attributed below to CPU 58 may be carried out by processor 50. Software for extracting higher-level information from the depth maps may run on processor 50, CPU 58, or both; and references in the present patent application and in the claims to a CPU or to a processor should be understood as referring to either or both of these elements. CPU 58 typically runs one or more application programs, which drive user interface 52 based on information provided by the middleware via an API, as described further hereinbelow.

Methods for Scene Analysis

Figure 3:
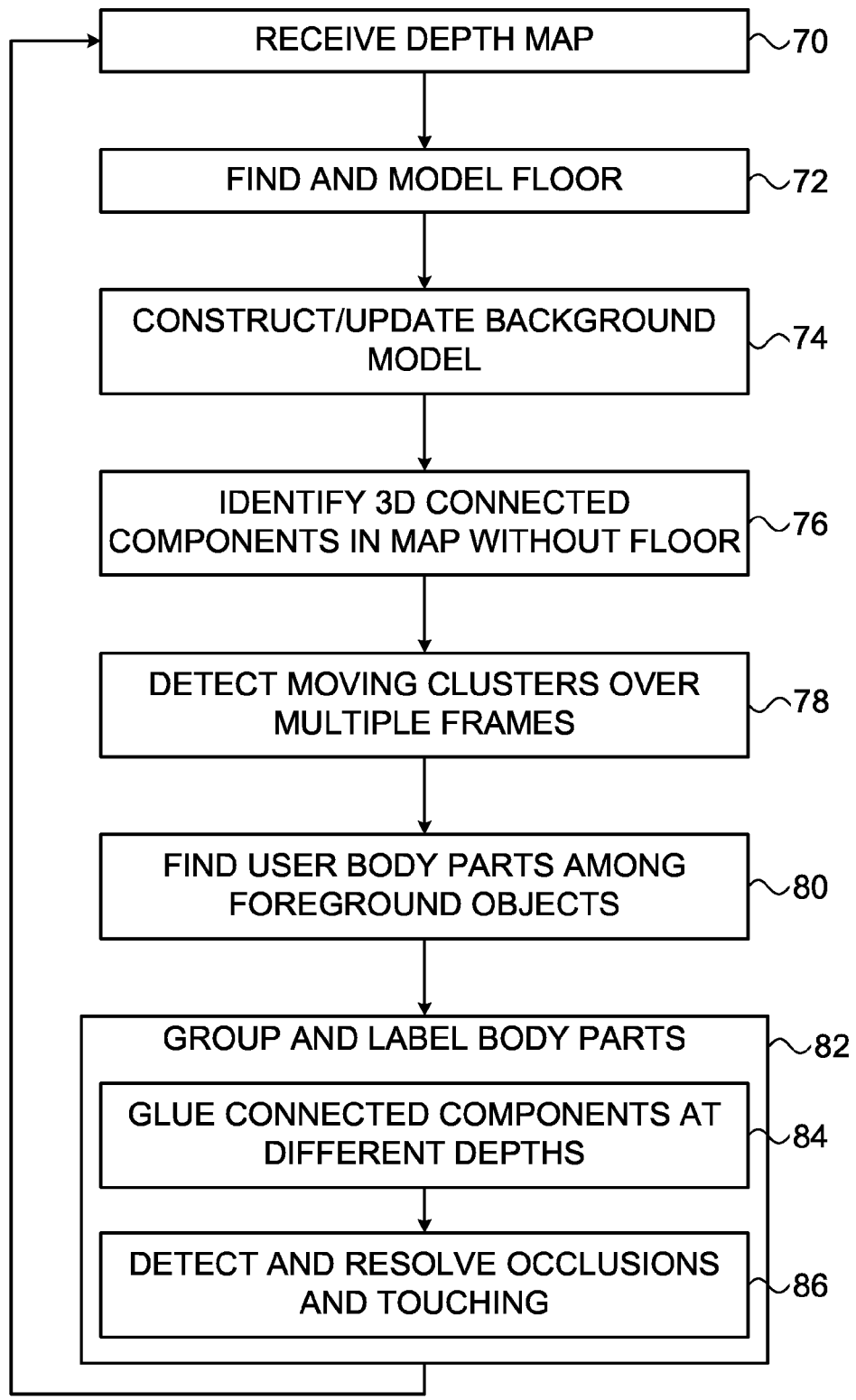
FIG. 3 is a flow chart that schematically illustrates a method for 3D scene analysis, in accordance with an embodiment of the present invention.

FIG. 3 is a flow chart that schematically illustrates a method for 3D scene analysis, in accordance with an embodiment of the present invention. The method is described, for the sake of clarity, with reference to the components of system 20 that are described above and to the elements shown in FIGS. 1 and 2. The principles of this method, however, may be implemented in substantially any suitable system for depth mapping and analysis. It is assumed, again for convenience and clarity of description, that the steps of the method are carried out in software by CPU 58, but some or all of these steps may be carried out instead by processor 50 or by another suitable digital processor.

Computer 24 receives a temporal sequence of depth maps from imaging assembly 22, at a depth map input step 70. The depth maps are typically output by imaging assembly in the general format of video images, at a fixed frame rate, with pixel values in raster order. (The maps in the sequence are therefore also referred to herein as map frames, or simply frames.) The pixel values in the depth maps may be either actual depth coordinate values or pattern disparity values, in pixels, which have a known, monotonic relation to the actual depth values. The method is carried out iteratively over each map frame in the sequence CPU 58 analyzes each depth map to locate and model floor 32, in a floor modeling step 72. This step is described in detail hereinbelow with reference to FIG. 4. Apparent changes in the floor location (or in other parts of the stationary background) can provide the CPU with an indication that the camera has moved, due to either accidental or intentional contact by one of the users, for example. The CPU removes the pixels that have been identified as belonging to the floor plane from the depth map, typically by assigning them null depth values.

CPU 58 builds a model of the scene background gradually, over the sequence of map frames, at a background construction step 74. For each pixel, the CPU saves its maximum depth value (or equivalently, the maximum disparity in comparison with the reference image) over the sequence. The depth value of a pixel in the background is the maximum disparity value over time of this pixel. If a pixel did not have depth value available (not due to shadows) for more than certain number of successive frames, the background model will lose its value at this pixel. If the pixel does not have a depth value due to shadow, and the object casting the shadow is further away than the current background depth value, the pixel will lose its current background value. If a pixel in the background model does not have a depth value and has a value in the current frame, and the foreground connected component containing this pixel is adjacent to the background, the background value in this pixel will become the current value.

With respect to pixels belonging to moving objects in a given map, CPU 58 may have saved background values for these pixels before they were blocked by a foreground object or after the foreground object has moved away. For example, an area of window 36 is obscured by the head of user 30 in the scene shown in FIG. 1, but this same area may be revealed to imaging assembly 22 when the user changes his posture in a subsequent map frame. Therefore, CPU 58 builds up the background model cumulatively, over multiple frames, as the union of the different portions of the background that are revealed in each frame.

As noted above, a foreground object, such as the bodies of users 28 and 30, may cast a shadow on objects behind it, with the result that imaging assembly 22 will be unable to extract depth values in the shadow. To avoid artifacts in the depth map due to the shadow, CPU 58 identifies areas with no depth value that are adjacent to an object as belonging to that object. The shadow is allowed to include pixels only up to a certain maximum shadow width, which is determined by the difference in pattern shift between foreground and background parts of the depth map. It can be shown geometrically that the maximum shadow width (in pixels) is ⅛ times the maximal difference in the shift of the pattern between background and foreground objects. CPU 58 may compute a shadow image, indicating shadowed areas of the map, for use as a mask in controlling update of the background model.

CPU 58 may "dump" the background model in order to eliminate artifacts that might otherwise add noise in subsequent processing. For example, if the CPU detects a connected component in a given area at a depth that is close to the depth of the background model in that area, it may correct the depth values of the background model according to the values of this component. On the other hand, if the CPU has been tracking the connected component in previous frames and identified it as a part of a humanoid form (or at least a candidate to be a part of a humanoid form), it will maintain the separation even when the connected component touches the background. Pixels with foreground depth values that are not identified as being a part of an moving object over a certain number of frames can likewise be attached to the background.

CPU 58 removes the floor, and then attempts to find, among the foreground pixels and previously detected pixels remaining in the map, 3D connected components that may correspond to parts of humanoid forms, at a component detection step 76. The CPU may "remove" pixels that were not previously identified as parts of humanoid forms and are not foreground, by assigning them artificial depth values, outside the range of the foreground depth values, so that they will not be considered in segmentation of the foreground pixels, but will still be considered as scene components for other uses that are explained below.

The CPU assigns an identifier to label each 3D connected component that it has found and computes properties of the component, including:
1. Number of pixels;
2. Bounding box containing the component;
3. Center of mass;
4. Area;
5. Number of foreground pixels (in case part of the component has background depth values);
6. Identifiers of other nearby components.

Alternatively or additionally, other properties may be computed and saved. The CPU uses the identifiers and component properties in tracking movement of humanoid forms from frame to frame. Thus, the connected components in a given frame will typically be composed of foreground pixels and pixels that were found to belong to humanoid forms in the previous frame.

CPU 58 processes the depth map to identify new 3D clusters, at a cluster detection step 78. Such clusters may correspond to humanoid body that were not identified in previous frames and is used, inter alia, in the initial identification of humanoid forms when system operation begins. Step 78 is described in greater detail hereinbelow with reference to FIGS. 5 and 6.

The clusters identified at step 78 are made up of blocks of adjacent pixels having approximately the same depth value, which are grouped into 3D clusters with mutually-adjacent depth values. Clusters that appear in consecutive frames with relative movement no greater than a predetermined threshold (for example, 10 cm) are tracked. The CPU builds a bounding box around each candidate cluster and tracks its movement over multiple successive map frames. The CPU identifies candidates that move cumulatively by more than some minimum threshold (such as 20 cm) as moving objects. Movement is defined for this purpose as movement of both edges of the cluster, i.e., both the left and right sides should shift, generally in the same direction.

CPU 58 processes the connected components and clusters found at steps 76 and 78 in order to segment and identify the components that may correspond to humanoid body parts, at a segmentation step 80. It then groups together neighboring components to reconstruct humanoid body forms, at a component grouping step 82. This step may include a number of sub-operations. In simple cases, a humanoid form will appear as a single 3D connected component and will be labeled as such. Such a form can be identified readily, for example, by performing a calibration procedure, in which the user stands facing imaging assembly 22 in a prescribed posture. This procedure helps CPU 58 in tracking the user's body parts as he moves subsequently while running a game or other application on computer 24.

In other cases, CPU 58 may need to group two or more connected components at different depths in order make up a single humanoid body form, in a gluing sub-step 84. As noted above, if the entire form was identified in a previous map frame, the common identifier and metadata can be used to maintain the association between the components. Additionally or alternatively, unlabeled, moving connected components in mutual proximity may be grouped together and assigned a common identifier even if not labeled previously.

On the other hand, when a user touches a foreground object (including another user), the user and the object may temporarily appear as a single 3D connected component in one or more of the map frames. In this case, CPU 58 may erroneously assign them a common identifier. Subsequently, when the user moves away from the object, there may be two separate connected components in the depth map with the same identifier. In this case, the CPU may reset the identifier and rebuild the 3D connected component (or components) that actually correspond to the user's body.

Alternatively, in this sort of situation, CPU 58 may use an identifier that was assigned in a previous frame to separate the labeled pixels of the merged connected component that belong to the user's body from the pixels belonging to the other object with which the body is in contact. The CPU is thus able to segment to body correctly notwithstanding the contact. In particular, when the other object is another user, the CPU will assign a different, specific identifier to the pixels belonging to each of the two (or more) different humanoid forms in the scene. The different identifiers that have been assigned in one frame may then be used in a subsequent frame to assign each of the pixels of the merged connected component to the proper body.

Particular difficulties can arise when parts of a humanoid form are occluded by another object in one or more depth maps. CPU 58 detects and resolves such anomalies, at an occlusion detection step 86. This step is described in greater detail hereinbelow with reference to FIG. 7.

At the conclusion of step 82, all humanoid forms will, in most cases, have been identified. For each such humanoid form, CPU 58 assigns a common identifier to label all of the 3D connected components making up the form. The CPU labels all the pixels belonging to these connected components with the appropriate identifier. (Pixels that do not belong to any of the humanoid forms receive a null identifier.) The result is a segmented depth map, which can then be processed further to extract skeletons of the humanoid forms. At the same time, the matrix of labeled pixels is used as the point of departure in processing the next depth map that the CPU receives at step 70 in the next iteration through the method of FIG. 3.

Floor Detection

Figure 4:
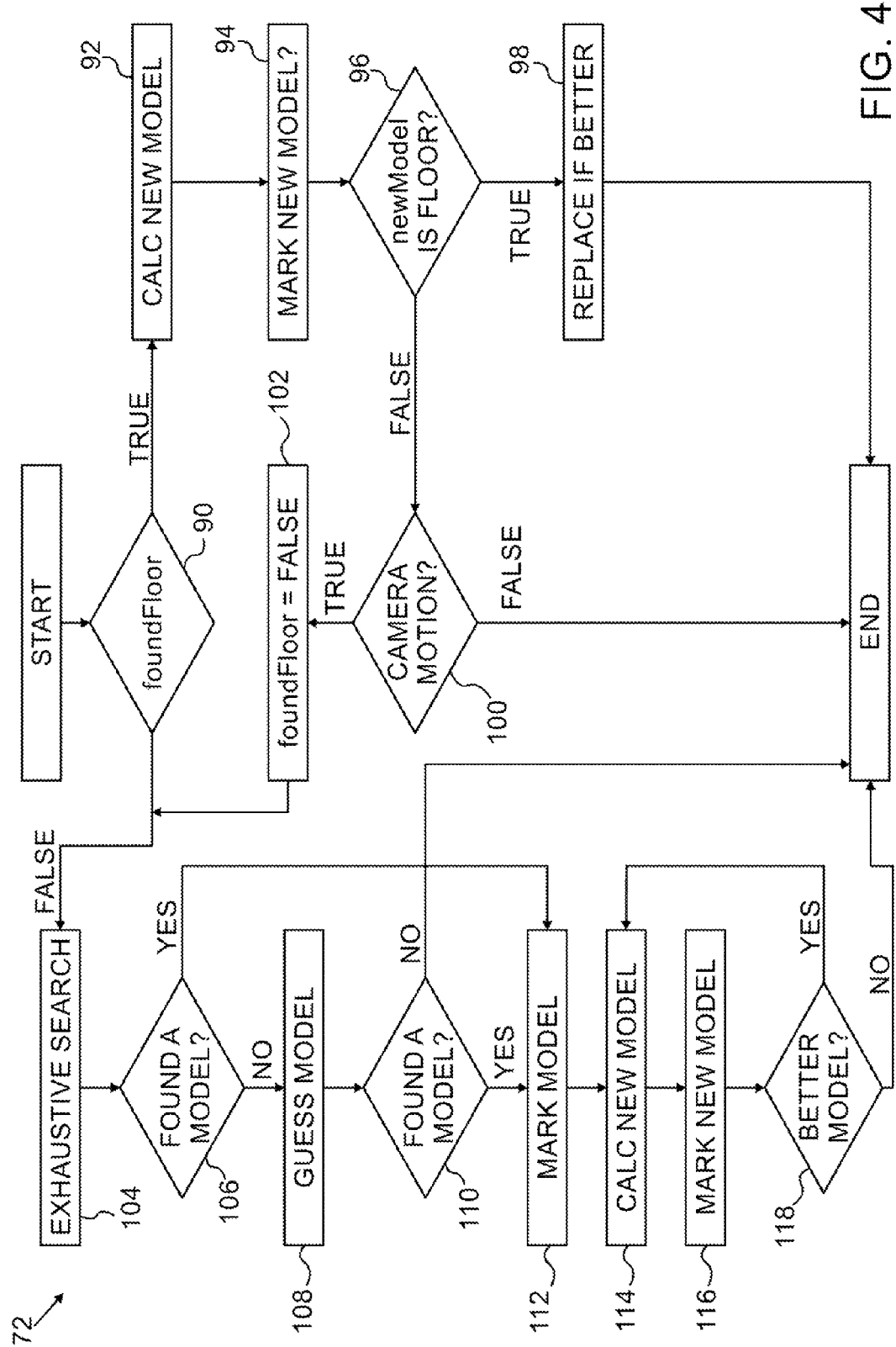
FIG. 4 is a flow chart that schematically illustrates a method for identifying the floor in a 3D scene, in accordance with an embodiment of the present invention.

FIG. 4 is a flow chart that schematically shows details of a method used at step 72 for detecting the floor in a 3D scene, in accordance with an embodiment of the present invention. The floor is defined as a planar surface in the scene, which is expected to be located in the lower part of the depth map. Any plane in the scene satisfies an equation of the form $AX+BY+CZ+D=0$, wherein $(X,Y,Z)$ are the coordinates in space, and A, B, C and D are constants. For depth maps that are based on disparity values s of a projected pattern, computed at each pixel $(x,y)$, the plane equation can be recast in terms of pixel coordinates and shift values $(x,y,s)$, with constants adjusted appropriately. Thus, the method of FIG. 4, as well as other elements of the method shown in FIG. 2, may be carried out on the raw map data, before even computing actual depth values. Details of the computation in the $(x,y,s)$ domain are described in the above-mentioned provisional patent application.

For each successive depth map, CPU 58 begins the process of finding the floor by checking whether a floor model was already found in the previous map frame, at a floor finding step 90. If so, the CPU calculates a new model for the existing floor, at a new model calculation step 92. For this purpose, the CPU creates a floor image containing all pixels in the depth map that are in the plane of the existing floor, to within a predetermined tolerance, or below the plane. (This floor image can subsequently be removed from the depth map in step 74.) The CPU calculates a confidence score for the new model, at a model marking step 94, and uses the score in deciding whether to accept or reject the floor plane for the current map frame, at a model evaluation step 96. The confidence score may be based, for example, on the number of pixels in the floor plane compared to the number of pixels below this plane (and therefore appear to be erroneous). If the existing floor plane is found to be acceptable, the CPU may adjust the plane parameters based on the floor image, at a floor replacement step 98. For example, the CPU may perform a least-squares fit of a plane to the pixels in the floor image in order to adjust the plane parameters.

If too many of the pixels in the floor image (for example, more than 1/6 of the pixels) are below the existing floor plane, the CPU rejects the new floor model at step 96. The reason for the failure of the floor model may be that imaging assembly 22 has moved, due to intentional or inadvertent contact by one of users 28 and 30, for instance. The CPU evaluates this possibility at a camera motion checking step 100. The CPU may, for example, compute the rate of change of the depth values in the background model. If a large, sudden increase in the rate of change is found, the CPU concludes that the camera has moved. Otherwise, the floor model is preserved to the next frame.

If the CPU finds at step 100 that the camera has moved, and the new floor model is invalid, it sets the current floor model to false, at a floor invalidation step 102, and then proceeds to search for a new floor. The CPU similarly begins a new floor search at the start of any new sequence of map frames.

Following step 102, the CPU may initially attempt an exhaustive floor search, at an exhaustive search step 104. In this step, the CPU identifies all horizontal pixels in the depth map (or possibly in a decimated version of the depth map, for computational efficiency), i.e., pixels whose local normal points upward. The local normal is computed by comparing the depth values of neighboring pixels. Based on the rules of perspective, the coordinates in space of each horizontal pixel predict a certain camera height above the floor, assuming the point to be on the floor. The CPU clusters the horizontal pixels according to the respective camera height predictions. The CPU then chooses, as the basis for the floor, the cluster that is located at the lowest plane in space among those clusters containing more than a predetermined minimal area.

The CPU checks whether a suitable cluster was found, at a search checking step 106. If so, the CPU computes the floor plane by linear regression over the pixels in the cluster and proceeds to a marking step 112, as described below. If no suitable cluster was found, the CPU takes the alternative course of rough estimation, at a model guessing step 108. At this step, the CPU randomly selects three pixels from the lower third of the depth map and computes the plane containing the three corresponding points in space. The CPU checks whether this plane is horizontal (with normal pointing upward), at a model checking step 110. If so, the CPU adopts this plane as the floor. Otherwise, the floor search terminates until the next frame.

CPU 58 evaluates the floor model that was found at step 104 or 108, at a model marking step 112. This step proceeds in substantially the same manner as step 94, which was described above. The CPU then calculates a new model for comparison, at a new model calculation step 114. This step is carried out in similar fashion to step 92, as described above. The CPU evaluates this new model, at a new model marking step 116, compares the result to the previous model score from step 112, at a model comparison step 118, and replaces the previous model with the new model if the latter scores better. The CPU may iterate through steps 114-118 until it achieves no further improvement in the model, at which point the process terminates until the next frame.

Although the method described above relates specifically to identifying the floor in a depth map (and then removing the floor from subsequent analysis), the same method may be used, mutatis mutandis, to find (and remove, if desired) other planar surfaces, such as walls, ceilings, and even table-tops. Furthermore, the methods described above may be adapted to identify other types of non-planar surfaces that are capable of parametric representation, such as spherical and parabolic surfaces that may appear in a depth map. The parameters of such surfaces may be derived from the depth map, for example, by linear least squares fitting of an appropriate 3D function to the points in the depth map. Fitting techniques that may be used for this purpose are described, for example, by Flannery et al., in *Numerical Recipes in C: The Art of Scientific Computing*, Second Edition (Cambridge University Press, 1992), pages 671-681, which is incorporated herein by reference.

Extracting Humanoid Forms

Figure 5:
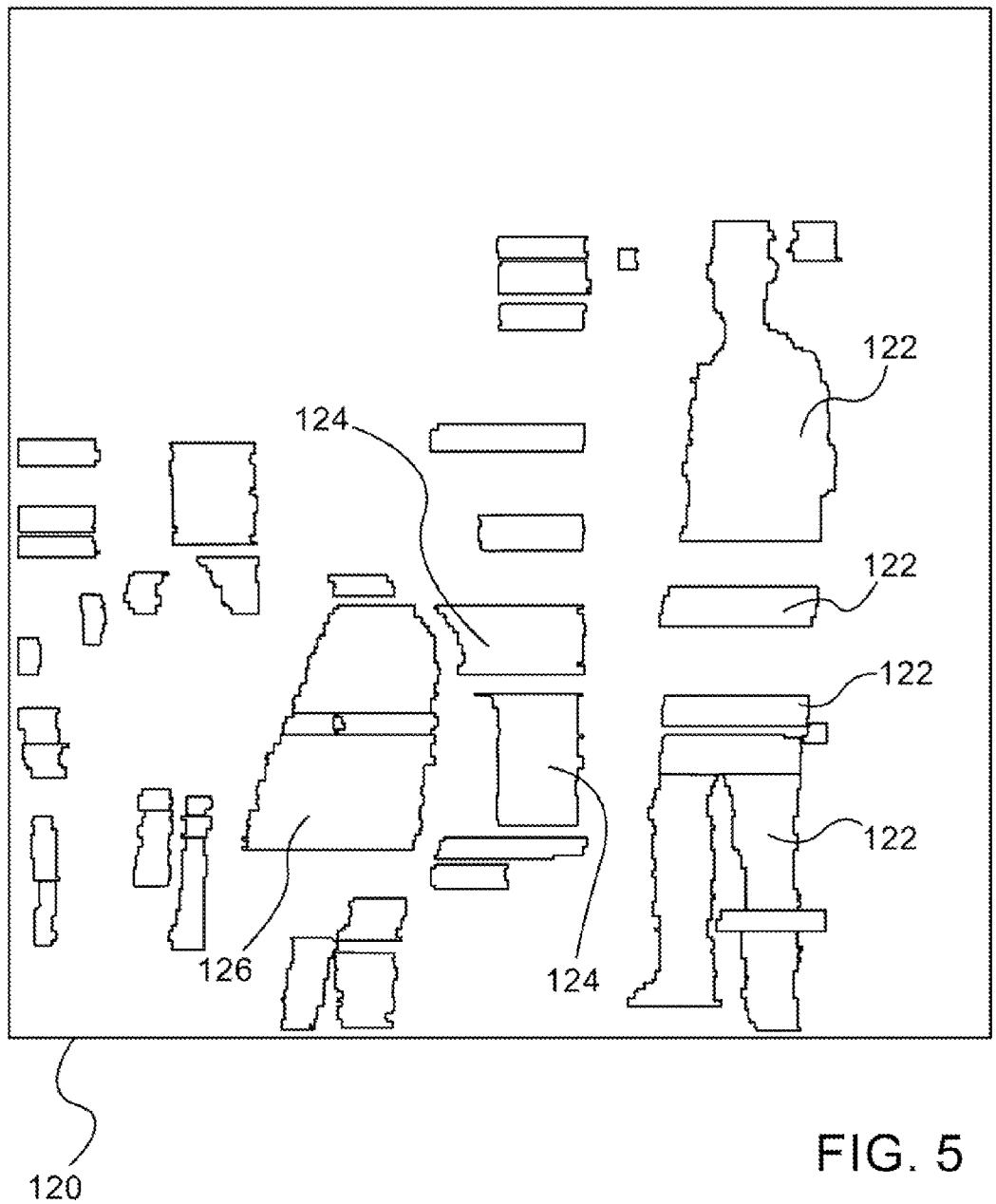
FIG. 5 is a schematic frontal representation of a depth map showing blocks corresponding to objects that have been identified in the depth map, in accordance with an embodiment of the present invention.
Figure 6:
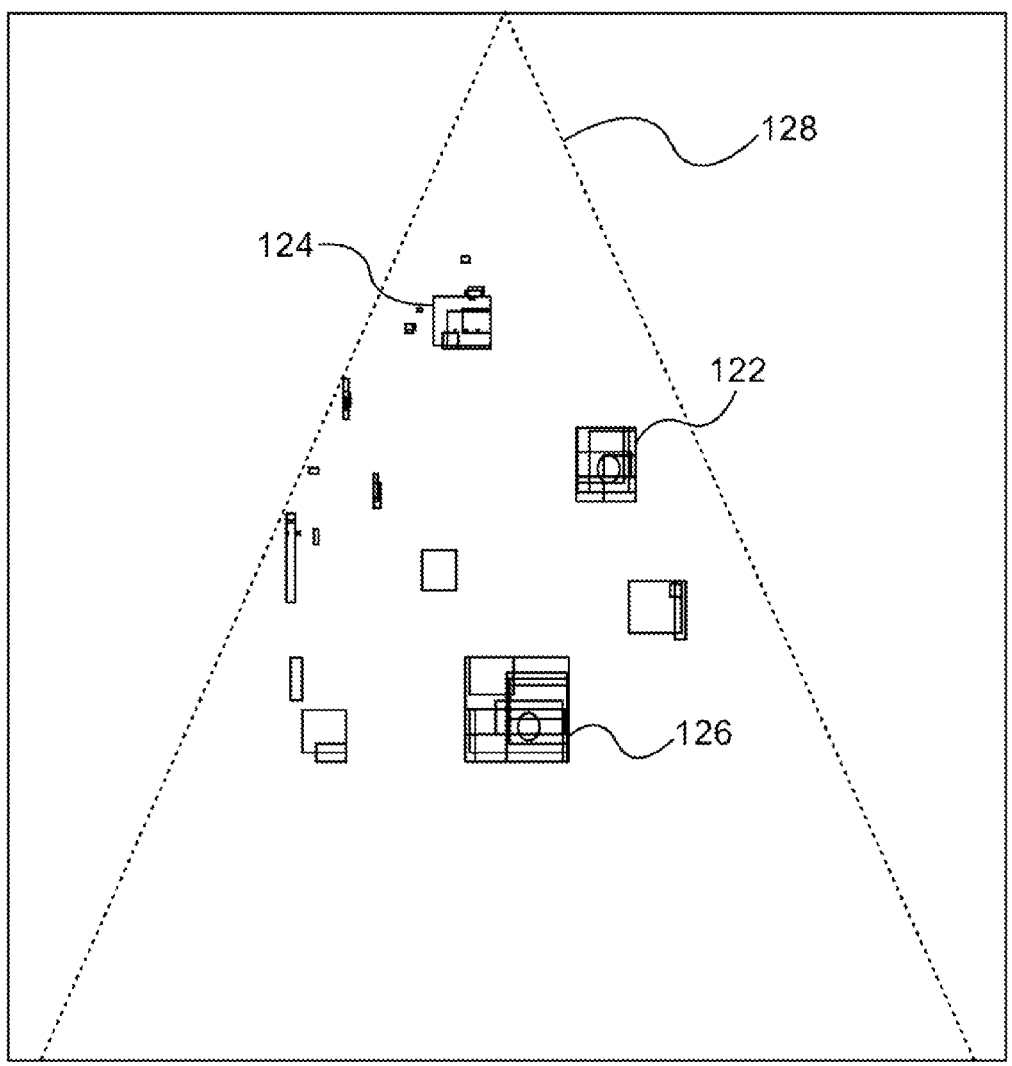
FIG. 6 is a schematic top view of a depth map showing clusters of blocks that have been identified in the depth map, in accordance with an embodiment of the present invention.

FIGS. 5 and 6 schematically represent a depth map 120, in frontal and top views, respectively, in accordance with an embodiment of the present invention. FIG. 5 shows blocks 122, 124, 126 corresponding to objects in the depth map. FIG. 6 shows clustering of the blocks, based on their projection onto XZ plane. These figures illustrate an implementation of component detection step 74 (FIG. 3).

To find the blocks shown in FIG. 5, CPU 58 differentiates the depth map along the X (horizontal) direction. For this purpose, pixels for which no depth value could be found are assigned an arbitrary, very large depth value. Pixels where the derivative value is greater than a certain threshold are classified as edges. To avoid edge artifacts, before differentiating the depth map, the shadows of foreground objects (as explained above) are assigned the same depth value as the objects casting them. The CPU then searches the rows of the differentiated depth map to find runs of pixels bounded by a positive edge on the left and a negative edge on the right, with no edge in between.

The CPU creates blocks 122, 124, 126 containing runs of this sort that occur in multiple adjacent rows and meet the following criteria:
  The runs occur in at least a minimum number (five, for example) of successive rows.
  The difference in depth values between the rows is no greater than a predetermined threshold.
  The runs overlap in the X direction by at least a minimum overlap percentage (for example, at least 80% of the shortest run in the block).

The CPU computes geometrical features of each block, such as the bounding coordinates, median depth values, center of mass, and area.

CPU 58 then groups the blocks into 3D clusters, as illustrated in FIG. 6. This figure shows a view of the 3D depth map in the X-Z plane, with depth (Z) increasing from top to bottom of the figure. A triangular area 128 represents the field of view of imaging assembly 22. Here blocks 122, 124 and 126 can be seen as clusters at different, respective ranges of depths. Blocks 122 correspond to parts of a humanoid form at middle depth, as seen at the right in FIG. 5. Blocks 124 correspond to a chair in the foreground, while blocks 126 are a part of the background.

The CPU groups blocks together in a cluster if the blocks meet certain geometrical criteria. For example, the CPU may require that the respective bounding boxes of the blocks in the X-Z plane overlap by at least some minimum amount and that the respective center of mass of each block be contained within the bounding boxes of the other blocks in the cluster. A cluster is marked as a candidate to belong to a humanoid form if the sum of the areas of the blocks is at least the area of a small person.

As noted earlier, clusters are considered candidates to be humanoid forms if they persist, typically with some movement, over multiple map frames, in addition to meeting the above-mentioned geometrical criteria. Thus, if a given cluster appears in the same general location as an identified humanoid form in the previous frame, the CPU maintains this identification and labels the cluster with the same identifier as in the previous frame.

Otherwise, to determine whether a cluster (which has persisted over a number of consecutive frames) is a humanoid form, the computer projects the blocks in the cluster onto the floor plane (found at step 72) and computes the geometrical properties of the projection, such as area, center of mass, and bounding box. All connected components in the depth map that fall within this bounding box are assumed to belong to the same candidate form. If the cumulative area of all these connected components is larger than a given threshold, the CPU groups the cluster and its associated connected components and assigns them a common identifier as a humanoid form. The CPU computes and saves the properties of this form, and tracks it over subsequent map frames, as described above.

Thus, referring back to FIGS. 5 and 6, the CPU will find the cluster of blocks 122 to meet the geometrical criteria and will identify this cluster as belonging to the humanoid form of a user of the computer. The cluster of blocks 124 is too small and will be disregarded. Although the cluster of blocks 126 is of sufficient size, it will ultimately be disregarded because it is stationary.

Figure 7:
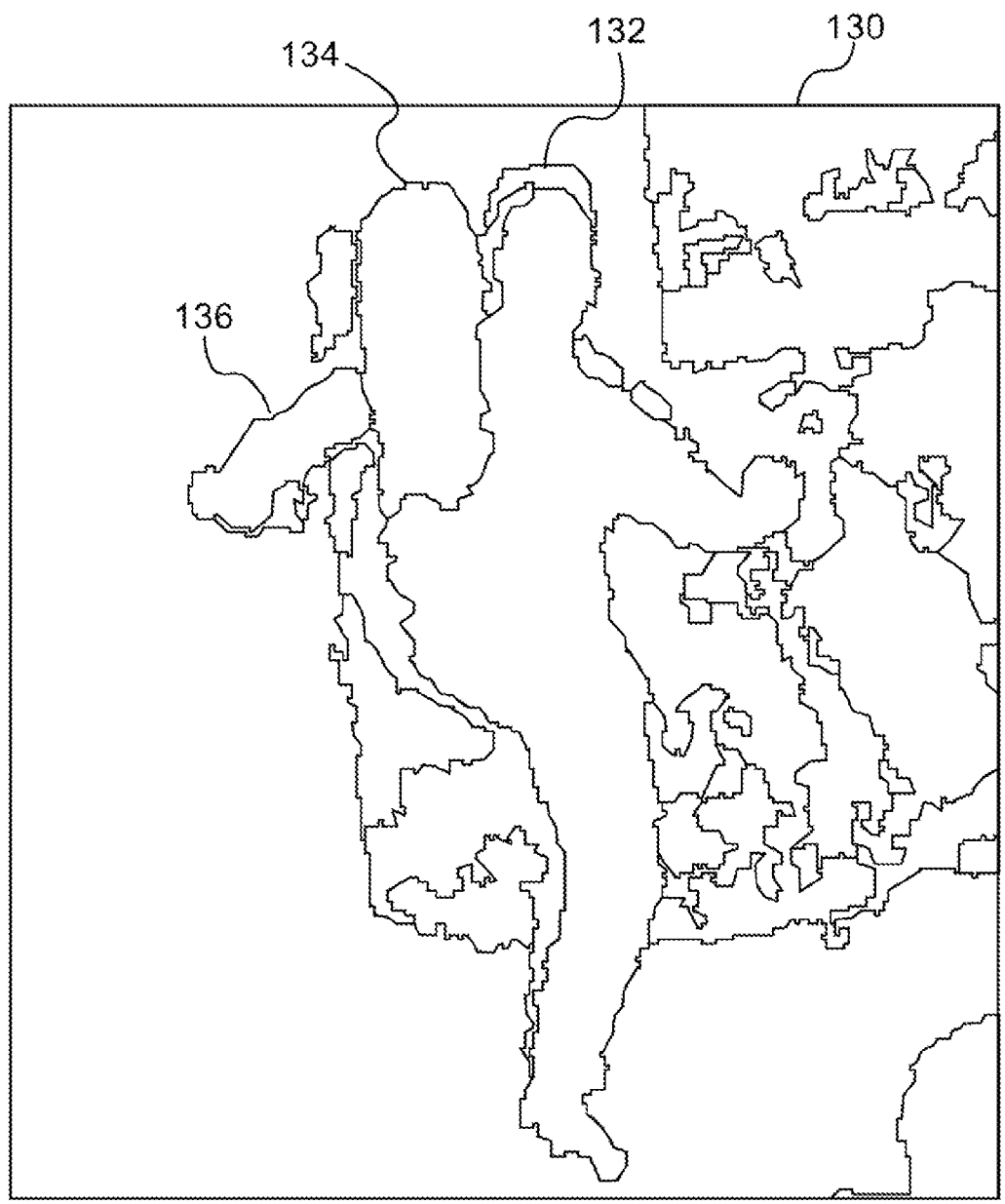
FIG. 7 is a schematic frontal representation of a depth map showing segmentation of objects in the depth map, in accordance with an embodiment of the present invention.

FIG. 7 is a schematic frontal representation of a depth map 130 showing segmentation of objects in the depth map, in accordance with an embodiment of the present invention. This figure is based on an actual depth map of a person who has rapidly raised his right leg for a karate kick, as might occur in an active computer game, for example. The body of the person appears as a 3D connected component 132, which appeared in previous map frames and therefore has an identifier and is labeled with computed geometrical characteristics. A new connected component 134, corresponding to the leg, has suddenly appeared in this map, at a substantially shorter distance than the rest of the body. Component 134 partially occludes body component 132 and cuts off this component from another connected component 136 corresponding to the person's arm.

To handle this sort of situation, when a connected component, such as component 134, suddenly appears in a map frame (and thus has no previously-assigned identifier), CPU 58 searches other nearby connected components that have previously been identified and labeled as humanoid forms. If the new connected component is adjacent in X and Y (the horizontal and vertical directions in FIG. 7) and close in depth to the previously-identified connected component (component 132 in the present example), with no areas of different depth in between (other than no-depth areas and occluding objects), the CPU ties the connected components together and assigns a common identifier to both. Thus, in the example shown in FIG. 7, the CPU will attach component 134 and 136 to component 132. The CPU will assign the identifier of component 132 to both of components 134 and 136, and will thus recognize and track these components as belonging to a single humanoid form.

Other considerations that may be used in conjoining connected components into a single body unit in this sort of situation include intersection of the respective bounding boxes and distances between their centers of mass.

Another type of anomaly handled by system 20 at step (FIG. 3) is occlusion of one humanoid form by another humanoid form or other foreground object. This sort of situation is illustrated in FIG. 1, where the left leg of user 28 cuts across the body of user 30. The result of this sort of situation will be that when CPU 58 analyzes the 3D connected components in the depth map of the pictured scene, the lower part of the right leg of user 30 will be separate from the rest of his body.

CPU 58 deals with this sort of situation using the data structures described above. Assuming that the body of user 30 was identified in its entirety, without occlusion, in previous map frames, the CPU will have the same common identifier associated with the connected component in the region of the right leg of user 30 as with the rest of the user's body. Furthermore, the CPU will recognize that the connected components corresponding to the right leg and to the body of user 30 are located in the same depth range, while the connected component corresponding to the body of user 28, including the left leg that separates the parts of the body of user 30, is at a smaller depth. Under these circumstances, the CPU will conclude that the separate connected components corresponding to the leg and body of user 30 are actually parts of the same humanoid form and will "glue" them together with a common identifier.

Once an occlusion of this sort has been detected and resolved, CPU 58 saves, for each of the humanoid forms, a record of other humanoid forms (as well as other foreground objects) that occlude it and a record of other humanoid forms that it occludes. These records are useful in resolving occlusions that may occur in subsequent frames. Similar techniques may be used in detecting and resolving situations in which one human form touches the other.

Optionally, CPU 58 may track the motion of the parts of humanoid forms from frame to frame and thereby estimate the velocity of motion of these body parts. The CPU may use the velocity in extrapolating the locations of parts of the users' bodies even when they are occluded by other objects, and thus may maintain the proper identification of the occluded parts of humanoid forms in the depth maps.

As noted earlier, although the above embodiments are described, for clarity and convenience of explanation, with reference to a specific sort of depth mapping system and certain types of computer applications, the principles of the present invention may similarly be applied to substantially any sort of depth map, regardless of how it is acquired, in any suitable system. Specifically, the methods of 3D connected component analysis and segmentation that are described above may be used in extracting objects of other kinds, and not only humanoid forms, from depth maps. The resulting segmented maps may be displayed directly for viewing by a user and may be used as input to substantially any sort of application program that accepts segmented maps or other images as its input.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing data, comprising:
receiving a depth map, captured by an imaging assembly, of a scene containing one or more objects positioned in relation to a planar surface corresponding to a floor on which at least one of the objects is positioned, the depth map comprising a matrix of pixels, at least some of which have respective pixel depth values and correspond to respective locations in the scene;
using a digital processor, processing the depth map so as to identify and generate a parametric model of the planar surface by:
computing local normals at the pixels in the depth map;
processing respective depth values of at least some of the pixels in order to predict a height of the imaging assembly with respect to each pixel;
clustering the pixels according to the local normals and to the height of the imaging assembly predicted with respect to the pixels; and
choosing as the floor a cluster of the pixels that is located, according to the predicted height of the imaging assembly for the cluster, at the lowest plane in space among a set of clusters containing more than a predetermined minimal area in the depth map; and
segmenting one or more of the objects in the scene by removing the planar surface represented by the parametric model from the depth map.

2. The method according to claim 1, wherein at least one of the objects is a humanoid figure, and wherein segmenting the one or more of the objects comprises extracting the humanoid figure from the depth map.

3. The method according to claim 1, wherein removing the planar surface comprises assigning null depth values to the pixels having coordinates within the planar surface.

4. The method according to claim 1, wherein processing the depth map comprises calculating a confidence score by comparing a first number of the pixels within the plane of the floor to a second number of pixels below the plane of the floor, and accepting or rejecting a choice of the floor responsively to the confidence score.

5. Apparatus for processing data, comprising:
an imaging assembly, which is configured to produce a depth map of a scene containing one or more objects positioned in relation to a planar surface corresponding to a floor on which at least one of the objects is positioned, the depth map comprising a matrix of pixels, at least some of which have respective pixel depth values and correspond to respective locations in the scene; and
a processor, which is configured to process the depth map so as to identify and generate a parametric model of the planar surface by:
computing local normals at the pixels in the depth map;
processing respective depth values of at least some of the pixels in order to predict a height of the imaging assembly with respect to each pixel;
clustering the pixels according to the local normals and to the height of the imaging assembly predicted with respect to the pixels; and
choosing as the floor a cluster of the pixels that is located, according to the predicted height of the imaging assembly for the cluster, at the lowest plane in space among a set of clusters containing more than a predetermined minimal area in the depth map, and
to segment one or more of the objects in the scene by removing the planar surface represented by the parametric model from the depth map.

6. The apparatus according to claim 5, wherein at least one of the objects is a humanoid figure, and wherein the processor is configured to extract the humanoid figure from the depth map.

7. The apparatus according to claim 5, wherein the processor is configured to assign null depth values to the pixels having coordinates within the planar surface.

8. The apparatus according to claim 5, wherein the processor is configured to calculate a confidence score by comparing a first number of the pixels within the plane of the floor to a second number of pixels below the plane of the floor, and to accept or reject a choice of the floor responsively to the confidence score.

9. A computer software product, comprising a tangible, non-transitory computer-readable medium in which program instructions are stored, which instructions, when read by a computer, cause the computer to receive a depth map, captured by an imaging assembly, of a scene containing one or more foreground objects positioned in relation to a planar surface corresponding to a floor on which at least one of the objects is positioned, the depth map comprising a matrix of pixels, at least some of which have respective pixel depth values and correspond to respective locations in the scene,
wherein the instructions cause the computer to process the depth map so as to identify and generate a parametric model of the planar surface by:
computing local normals at the pixels in the depth map;
processing respective depth values of at least some of the pixels in order to predict a height of the imaging assembly with respect to each pixel;
clustering the pixels according to the local normals and to the height of the imaging assembly predicted with respect to the pixels; and
choosing as the floor a cluster of the pixels that is located, according to the predicted height of the imaging assembly for the cluster, at the lowest plane in space among a set of clusters containing more than a predetermined minimal area in the depth map, and
to segment one or more of the objects in the scene by removing the planar surface represented by the parametric model from the depth map.

10. The product according to claim 9, wherein at least one of the objects is a humanoid figure, and wherein the instructions cause the computer to extract the humanoid figure from the depth map.

11. The product according to claim 9, wherein the instructions cause the computer to assign null depth values to the pixels having coordinates within the planar surface.

12. The product according to claim 9, wherein the instructions cause the computer to calculate a confidence score by comparing a first number of the pixels within the plane of the floor to a second number of pixels below the plane of the floor, and to accept or reject a choice of the floor responsively to the confidence score.

* * * * *